(12) United States Patent
Lee et al.

(10) Patent No.: US 11,809,724 B2
(45) Date of Patent: Nov. 7, 2023

(54) MEMORY CONTROLLER AND OPERATING METHOD THEREOF

(71) Applicant: SK hynix Inc., Icheon-si (KR)

(72) Inventors: Dong Kyu Lee, Icheon-si (KR); Seung Geol Baek, Icheon-si (KR); Jae Hyun Yoo, Icheon-si (KR); Seon Ju Lee, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 60 days.

(21) Appl. No.: 17/688,689

(22) Filed: Mar. 7, 2022

(65) Prior Publication Data
US 2023/0168827 A1    Jun. 1, 2023

(30) Foreign Application Priority Data

Nov. 30, 2021 (KR) ........................ 10-2021-0169587

(51) Int. Cl.
*G06F 12/00* (2006.01)
*G06F 3/06* (2006.01)

(52) U.S. Cl.
CPC ............ *G06F 3/064* (2013.01); *G06F 3/0604* (2013.01); *G06F 3/0631* (2013.01); *G06F 3/0659* (2013.01); *G06F 3/0673* (2013.01)

(58) Field of Classification Search
CPC .... G06F 3/064; G06F 3/0604; G06F 13/1668; G06F 2009/45583
See application file for complete search history.

(56) References Cited

U.S. PATENT DOCUMENTS

| | | | | |
|---|---|---|---|---|
| 10,528,529 B1* | 1/2020 | Pawar | .................... | G06F 3/0619 |
| 11,513,958 B1* | 11/2022 | Mukherjee | .......... | G06F 12/0804 |
| 2018/0067657 A1* | 3/2018 | Rao | ........................ | G06F 3/0604 |
| 2020/0089407 A1* | 3/2020 | Baca | ...................... | G06F 3/0635 |
| 2022/0075716 A1* | 3/2022 | Tikoo | .................. | G06F 12/0646 |
| 2022/0261180 A1* | 8/2022 | Shin | ........................ | G06F 3/0614 |

FOREIGN PATENT DOCUMENTS

KR    20200114149 A    10/2020

* cited by examiner

*Primary Examiner* — John A Lane
(74) *Attorney, Agent, or Firm* — Perkins Coie LLP

(57) ABSTRACT

A memory controller that controls a memory device including a plurality of memory blocks allocated to a plurality of zones for storing data is provided. The memory controller comprises a plurality of processing cores controlling data operations in the plurality of zones in the memory device; and an external interface unit in communication with an external device and configured to receive, from the external device, a write request requesting to perform a write operation on a first zone in the memory device, the external interface unit configured to identify a first processing core for controlling the first zone and determine a second core to perform the write operation based on a number of open zones controlled by the first core and having an open state indicating a capability to execute a program operation.

20 Claims, 10 Drawing Sheets

FIG. 5B

| ZONE_ID | ZONE | CORE | ZONE_ID | ZONE | CORE |
|---|---|---|---|---|---|
| LBA 1 | ZONE 1 | CORE_A | LBA 11 | ZONE 11 | CORE_C |
| LBA 2 | ZONE 2 | CORE_B | LBA 12 | ZONE 12 | CORE_D |
| LBA 3 | ZONE 3 | CORE_C | LBA 13 | ZONE 13 | CORE_A |
| LBA 4 | ZONE 4 | CORE_D | LBA 14 | ZONE 14 | CORE_B |
| LBA 5 | ZONE 5 | CORE_A | LBA 15 | ZONE 15 | CORE_C |
| LBA 6 | ZONE 6 | CORE_B | LBA 16 | ZONE 16 | CORE_D |
| LBA 7 | ZONE 7 | CORE_C | LBA 17 | ZONE 17 | CORE_A |
| LBA 8 | ZONE 8 | CORE_D | LBA 18 | ZONE 18 | CORE_B |
| LBA 9 | ZONE 9 | CORE_A | LBA 19 | ZONE 19 | CORE_C |
| LBA 10 | ZONE 10 | CORE_B | LBA 20 | ZONE 20 | CORE_D |

REQUESTED BY WT_REQ → (LBA 18)

CHANGING TO 'CORE_C' (CORE_B)
CHANGING TO 'ZONE 15' (ZONE 18)

FIG. 5C

|        | STATE  |         | STATE |
|--------|--------|---------|-------|
| ZONE 1 | OPEN   | ZONE 11 | OPEN  |
| ZONE 2 | OPEN   | ZONE 12 | EMPTY |
| ZONE 3 | FULL   | ZONE 13 | EMPTY |
| ZONE 4 | OPEN   | ZONE 14 | OPEN  |
| ZONE 5 | OPEN   | ZONE 15 | EMPTY → Changing to 'OPEN' |
| ZONE 6 | OPEN   | ZONE 16 | EMPTY |
| ZONE 7 | CLOSED | ZONE 17 | EMPTY |
| ZONE 8 | OPEN   | ZONE 18 | EMPTY |
| ZONE 9 | OPEN   | ZONE 19 | EMPTY |
| ZONE 10| OPEN   | ZONE 20 | EMPTY |

FIG. 5D

|          | CORE_A | CORE_B | CORE_C | CORE_D |
|----------|--------|--------|--------|--------|
| OPEN_CNT | 3      | 4      | 1      | 2      |

MEMORY CONTROLLER AND OPERATING METHOD THEREOF

CROSS-REFERENCE TO RELATED APPLICATION(S)

This patent document claims priority under 35 U.S.C. § 119(a) to Korean Patent Application No. 10-2021-0169587, filed on Nov. 30, 2021, the disclosure of which is incorporated herein by reference in its entirety.

TECHNICAL FIELD

Various embodiments of the disclosed technology generally relate to an electronic device, and more particularly, to a memory controller and an operating method thereof.

BACKGROUND

The computing environment paradigm is transitioning to ubiquitous computing, enabling computing to take place anytime and anywhere. The recent increase in the use of ubiquitous computing is leading to an increase in the use of portable electronic devices such as mobile phones, digital cameras, and notebook computers. These portable electronic devices generally use a memory system having one or more memory devices for storing data.

A memory system may be used as a main data storage device or an auxiliary data storage device of the portable electronic devices.

Semiconductor-based data storage devices provide advantages over the traditional hard disk drives since semiconductor memory devices have no mechanical components such as a mechanical arm, and thus offers excellent stability and durability, high data access rate and low power consumption. Examples of the semiconductor-based data storage devices include a USB (Universal Serial Bus) memory device, a memory card having various interfaces, a solid state drive (SSD) or others.

SUMMARY

Various embodiments of the disclosed technology are directed to a memory controller and an operating method of the memory controller, which is capable of preventing a load during a write operation from being concentrated on a specific core.

In addition, various embodiments of the disclosed technology are directed to a memory controller capable of equalizing load levels according to a write operation of a plurality of cores, and an operating method of the memory controller.

In an embodiment of the disclosed technology, a memory controller that controls a memory device including a plurality of memory blocks allocated to a plurality of zones, the memory controller comprising: a plurality of cores suitable for controlling the plurality of zones; and an external interface unit suitable for determining a core to perform a write operation corresponding to a write request of an external device, on the basis of the number of open zones in which a program operation is being performed under a control of a first core that controls a zone corresponding to the write request.

In another aspect, a memory controller that controls a memory device including a plurality of memory blocks that are allocated to a plurality of zones for storing data is provided. The memory controller comprises: a plurality of processing cores controlling data operations in the plurality of zones in the memory device; and an external interface unit in communication with an external device and configured to receive, from the external device, a write request requesting to perform a write operation on a first zone in the memory device, the external interface unit configured to identify a first processing core for controlling the first zone and determine a second core to perform the write operation based on a number of open zones controlled by the first core and having an open state indicating a capability to execute a program operation.

In some implementations, the external interface unit may determine, as the core to perform the write operation, a core that controls a smaller number of open zones than the open zones controlled by the first core. In some implementations, when the number of open zones controlled by the first core is equal to or greater than a threshold value, the external interface unit may determine, as the core to perform the write operation, a core that controls a smaller number of open zones than the threshold value. In some implementations, the core to perform the write operation may change an empty zone, which is controlled by the core and on which the execution of the program operation is not determined, to an open zone, and may perform the write operation on a memory block allocated to the newly-changed open zone.

In another embodiment of the disclosed technology, a memory controller that controls a memory device including a plurality of memory blocks allocated to a plurality of zones, the memory controller comprising: a plurality of cores suitable for controlling the plurality of zones; a zone information manager suitable for generating a plurality of open count values in response to a write request received from an external device, the open count values each indicating the number of open zones on which a write operation is controlled by each of the plurality of cores and execution of a program operation is determined; and a core control unit suitable for determining a second core to perform the write operation corresponding to the write request, on the basis of a first open count value of a first core that controls a zone corresponding to the write request.

In another aspect, a memory controller that controls a memory device including a plurality of memory blocks allocated to a plurality of zones is provided. The memory controller comprises: a plurality of cores controlling the plurality of zones to perform data operations in the plurality of zones; a zone information manager in communication with an external device and configured to (1) receive, from the external device, a write request requesting to perform a write operation on a first zone and (2) generate, in response to receiving the write request, open count values corresponding to the plurality of cores that indicate a number of zones controlled by a corresponding core and having an open state indicating a capability to execute a program operation; and a core control unit in communication with the zone information manager and configured to determine a second core to perform the write operation based on a first open count value for a first core controlling the first zone.

In some implementations, the core control unit may determine, as the second core, a core having an open count value smaller than the first open count value. In some implementations, the core control unit may determine the first core as the second core when the first open count value is not the maximum. In some implementations, when the first open count value is equal to or greater than a threshold value, the core control unit may determine, as the second core, a core that controls a smaller number of open zones than the threshold value. In some implementations, the threshold value may include an average value of the plurality of open count values. In some implementations, the threshold value may greater than an average value of the number of open zones controlled by each of the plurality of cores, and is smaller than a maximum open count value. In some implementations, the second core changes an empty zone, which is controlled by the second core and on which the execution of the program operation is not determined, to an open zone, and performs the write operation on a memory block allocated to the newly-changed open zone.

In another embodiment of the disclosed technology, an operating method of a memory controller that controls a memory device, including a plurality of memory blocks allocated to a plurality of zones, through a plurality of cores included therein, the operating method comprising: generating a plurality of open count values in response to a write request received from an external device, the open count value each indicating the number of open zones which are controlled by each of the plurality of cores, and on which execution of a program operation is determined; and determining a second core to perform a write operation corresponding to the write request, on the basis of a first open count value of a first core that controls a zone corresponding to the write request.

In another aspect, an operating method of a memory controller that controls a memory device including a plurality of memory blocks allocated to a plurality of zones is provided. The operating method comprises: generating a plurality of open count values in response to receiving, from an external device, a write request requesting to perform a write operation on a first zone, the open count value for each core indicating a number of zones controlled by a corresponding core and having an open state indicating a capability to execute a program operation; and determining a second core to perform a write operation corresponding to the write request based on a first open count value corresponding to a first core that controls the first zone.

In some implementations, the determining of the second core may include determining, as the second core, a core having an open count value smaller than the first open count value. In some implementations, the determining of the second core may include determining, as the second core, a core having a minimum open count value when the first open count value is the maximum among the plurality of open count values. In some implementations, the determining of the second core may include determining the first core as the second core when the first open count value is not the maximum. In some implementations, the determining of the second core may include determining, as the second core, a core that controls a smaller number of open zones than a threshold value when the first open count value is equal to or greater than the threshold value. In some implementations, the threshold value may include an average value of the plurality of open count values. In some implementations, the threshold value may be greater than an average value of the number of open zones controlled by each of the plurality of cores, and is smaller than a maximum open count value.

BRIEF DESCRIPTION OF THE DRAWINGS

FIGS. 5A to 5D are diagrams illustrating an example of an operation in which a memory controller changes a core performing a write operation in accordance with an embodiment.

DETAILED DESCRIPTION

Figure 1A:
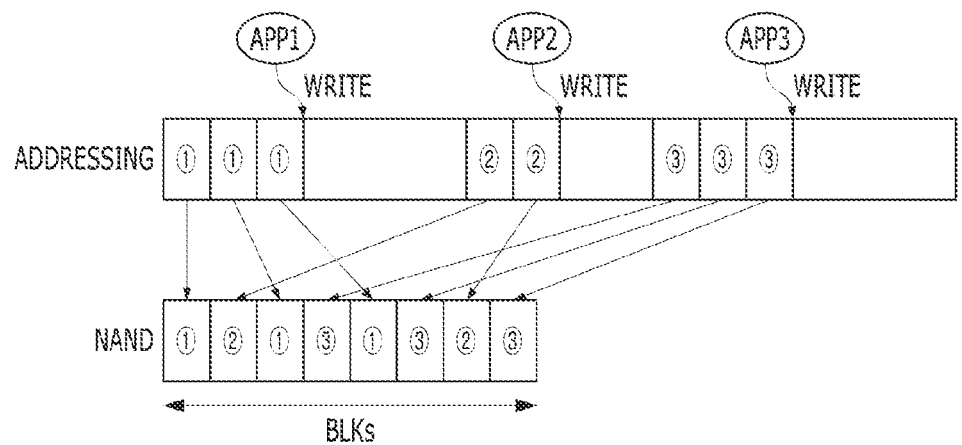
FIGS. 1A to 1C are diagrams illustrating an operation of a data processing system.

Various examples of the disclosure are described below in more detail with reference to the accompanying drawings. The disclosure may be embodied in other embodiments, forms and variations thereof and should not be construed as being limited to the embodiments set forth herein. Throughout the disclosure, like reference numerals refer to like parts throughout the various figures and examples of the disclosure. It is noted that reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to describe various elements, these elements are not limited by these terms. These terms are used to distinguish one element from another element that otherwise have the same or similar names. Thus, a first element in one instance may be referred to as a second or third element in another instance without departing from the spirit and scope of the invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via one or more intervening elements. Communication between two elements, whether directly or indirectly connected/coupled, may be wired or wireless, unless the context indicates otherwise. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the invention.

As used herein, singular forms are intended to include the plural forms and vice versa, unless the context clearly indicates otherwise. The articles 'a' and 'an' as used in this application and the appended claims should generally be construed to mean 'one or more' unless specified otherwise or made clear from context to be directed to a singular form.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

It is noted, that in some instances, as would be apparent to those skilled in the relevant art, a feature or element described in connection with one embodiment may be used independently or in combination with other features or elements of another embodiment.

Embodiments of the disclosed technology will be described in detail with reference to the accompanied drawings.

Hereinafter, various embodiments of the disclosed technology will be described below in detail with reference to the accompanying drawings.

Figure 1B:
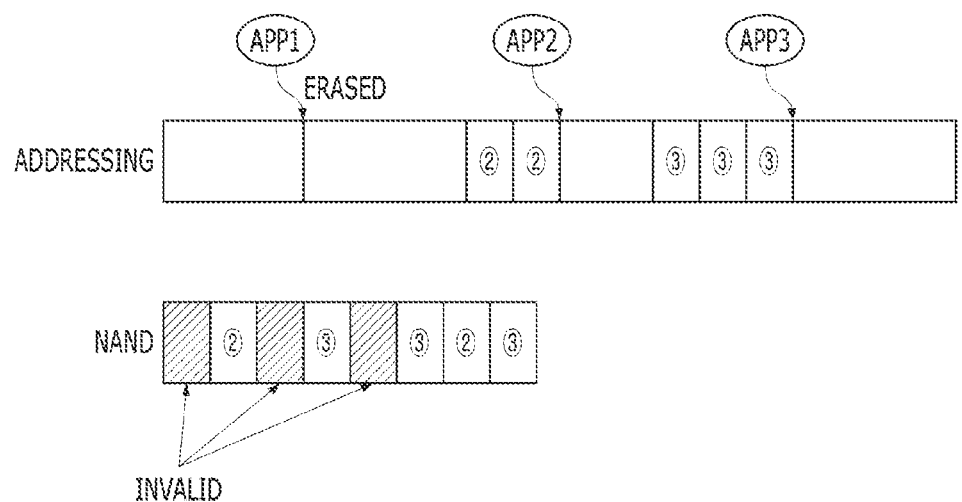
Figure 1C:
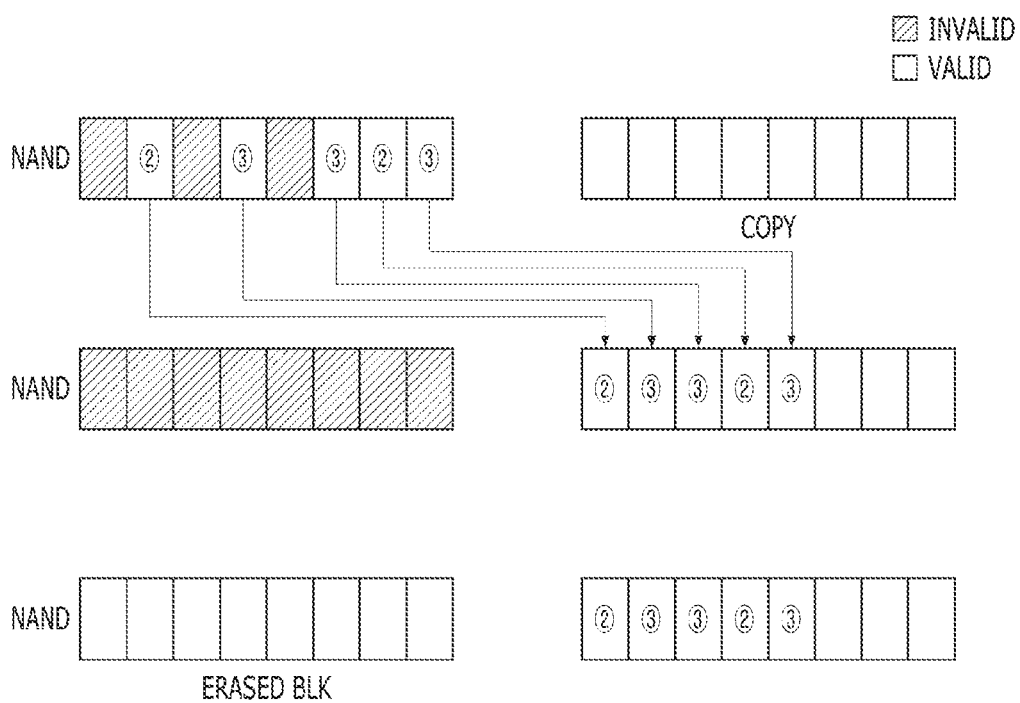

FIGS. 1A to 1C are diagrams illustrating an operation of a data processing system. FIG. 1A illustrates an example in which three application programs are driven with a single memory block in the memory system.

Technologies such as artificial intelligence (AI), big data and cloud operate through a data center. The data center includes a memory system implemented with a flash memory, and a plurality of application programs are driven for a single memory system. The plurality of application programs may be driven by an external device such as a computer or a mobile phone. Each of the plurality of application programs stores data in logical block addresses (LBAs), and the memory system stores data, which are stored in the logical block addresses, in a single memory block. The memory system stores data, which are provided from different application programs, in the single memory block, and subsequently maps logical block addresses and physical addresses of the single memory block.

FIG. 1A illustrates an example in which three application programs are driven for a single memory system.

A plurality of logical block addresses covering a storage capability of the single memory system can be classified into zones, each zone assigned to the three application programs. Each of the three application programs may associate a logical block address in an assigned zone for a piece of data generated by each application program.

In the illustrated example of FIG. 1A, a first application program APP1 may generate three pieces of first data ①, assign three logical block addresses, among the plurality of logical block addresses, to the three pieces of first data ①, and try to store the three pieces of first data ① in a memory device (e.g., NAND) of the memory system. A second application program APP2 may generate two pieces of second data ②, assign two other logical block addresses to the two pieces of second data ②, and try to store the two pieces of second data ② in the memory system. Likewise, a third application program APP3 may generate three pieces of third data ③, assign three logical block addresses, among the plurality of logical block addresses, to the three pieces of third data ③, and try to store the three pieces of third data ③ in the memory system. The memory system may program the first, second and third data ①, ②, ③ in different locations of a single memory block BLK of the memory device. The single memory block BLK may include plural regions, with a different region exclusively assigned to each of the first to third application programs APP1-APP3. Accordingly, the memory block BLK may store all data stored by each of the first to third application programs APP1-APP3.

FIG. 1B shows an erase operation in the memory system when the first application program APP1 erases at least one piece of data which has been stored in the memory block BLK.

In the memory system, read and program operations are performed in units of pages, whereas the erase operation is performed in units of memory blocks. When the first application program APP1 issues an erase command for programmed data while data stored by a plurality of application programs are stored in the single memory block BLK, the memory system may invalidate the data corresponding to the first application program APP1. As illustrated in FIG. 1B, the data corresponding to the first application program APP1 among plural pieces of data included in the memory block BLK are invalid INVALID, and the data corresponding to second and third application programs APP2 and APP3 are still valid. When the size of invalid data included in the memory block increases, available storage capacity of the memory system decreases. Therefore, the memory system performs a garbage collection operation to convert a region in which invalid data are stored into an available region for storing other data.

FIG. 1C is a diagram illustrating a garbage collection operation on the memory block BLK.

The memory system copies valid data, which are stored in the memory block BLK, to an empty memory block. Referring to FIG. 1C, the memory system copies the data stored by the second and third application programs APP2 and APP3, i.e., valid data, to the empty memory block, except for the data stored by the first application program APP1, i.e., invalid data. After copying the valid data to the empty memory block, the memory system invalidates all the valid data stored in the memory block BLK, and performs an erase operation on the memory block BLK. The memory system copies only valid data from a memory block including invalid data to an empty memory block, and subsequently performs an erase operation on the memory block to complete the garbage collection operation.

The size of invalid data stored in a memory block increases due to an erase command generated by one application program. When the garbage collection operation is performed to remove the invalid data, read and program operations that are in progress are temporarily stopped, which may degrade service quality. A data processing system using a zoned namespace (ZNS) may solve the performance degradation issue caused by performance interference between a plurality of application programs and occurrence of the garbage collection operation.

Figure 2:
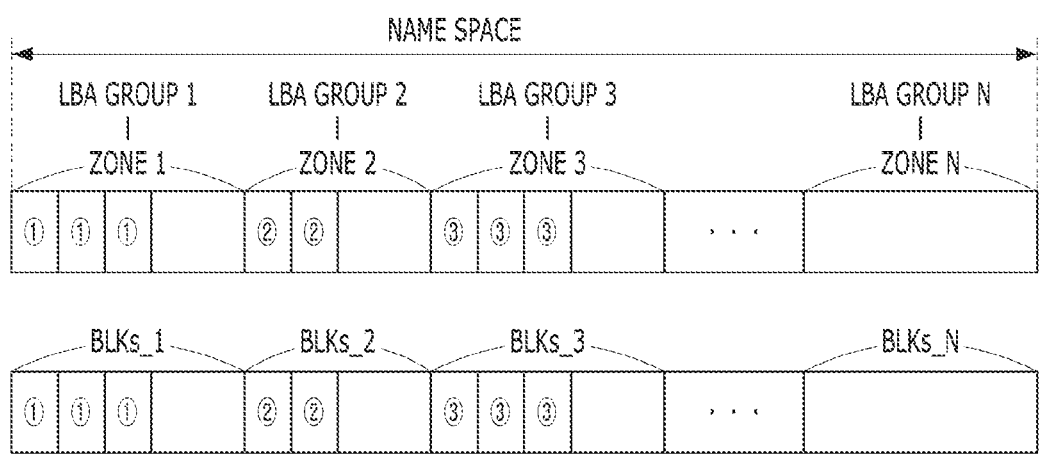
FIG. 2 is a diagram illustrating a data storage method of a data processing system using a zoned namespace of the disclosed technology.

FIG. 2 is a diagram illustrating a data storage method of a data processing system using a zoned namespace.

The zoned namespace (ZNS) refers to a technique of dividing a namespace into a plurality of zones. A namespace refers to an amount of storage in a non-volatile memory that can be formatted as a logical block. In the data processing system using a zoned namespace, each zone is allocated for a corresponding application program so that a plurality of application programs may individually store their data with sequential logical block addresses assigned to each zone. Not only are logical block addresses grouped into plural parts corresponding to the plural zones, but a storage region of the memory system is also divided into physical regions corresponding to the plural zones. Because a single zone may store plural pieces of data generated or associated with the same application, attributes or properties of the plural data stored in the single zone can be similar. Also, logical block addresses in each zone can be continuous. In a memory system with a zoned namespace, at least one memory block allocated for each zone can be programmed sequentially.

Referring to FIG. 2, a namespace NAMESPACE is divided into a plurality of zones ZONE 1 to ZONE N. In an embodiment, each of the plurality of zones ZONE_1 to ZONE_N may have the same size. A single application program may correspond to a single zone. In another embodiment, a single application program may use plural zones to store plural pieces of data generated by itself. In each zone, a plurality of consecutive logical block addresses is assigned. A storage inside the memory device can be also divided into plural regions respectively corresponding to the plurality of zones ZONE_1 to ZONE_N so that each zone in a logical domain may correspond to a respective one of the regions in a physical domain. The zones in the physical region may have the same size, and the size of each of the zones may be an integer multiple of an erase unit.

For example, it is assumed that the first to third application programs APP1 to APP3 correspond to the first to third zones ZONE 1 to ZONE 3, respectively. The first application program APP1 stores data in logical block addresses included in the first zone ZONE 1. The logical block addresses included in the first zone ZONE 1 are contiguous, and the host provides the memory system with identification information regarding a zone and program data with a program command. On the basis of the identification information regarding the zone, the memory system sequentially programs the data stored in the logical block addresses included in the first zone ZONE 1 into first memory blocks BLKs_1 corresponding to the first zone ZONE 1.

Likewise, data associated with the second and third zones ZONE 2 and ZONE 3 are stored in second memory blocks BLKs_2 or third memory blocks BLKs_3, respectively. In a case of a memory system using a zoned namespace, data provided from different application programs are stored in different regions among internal regions of the memory device, which are divided into the plurality of zones.

Figure 3:
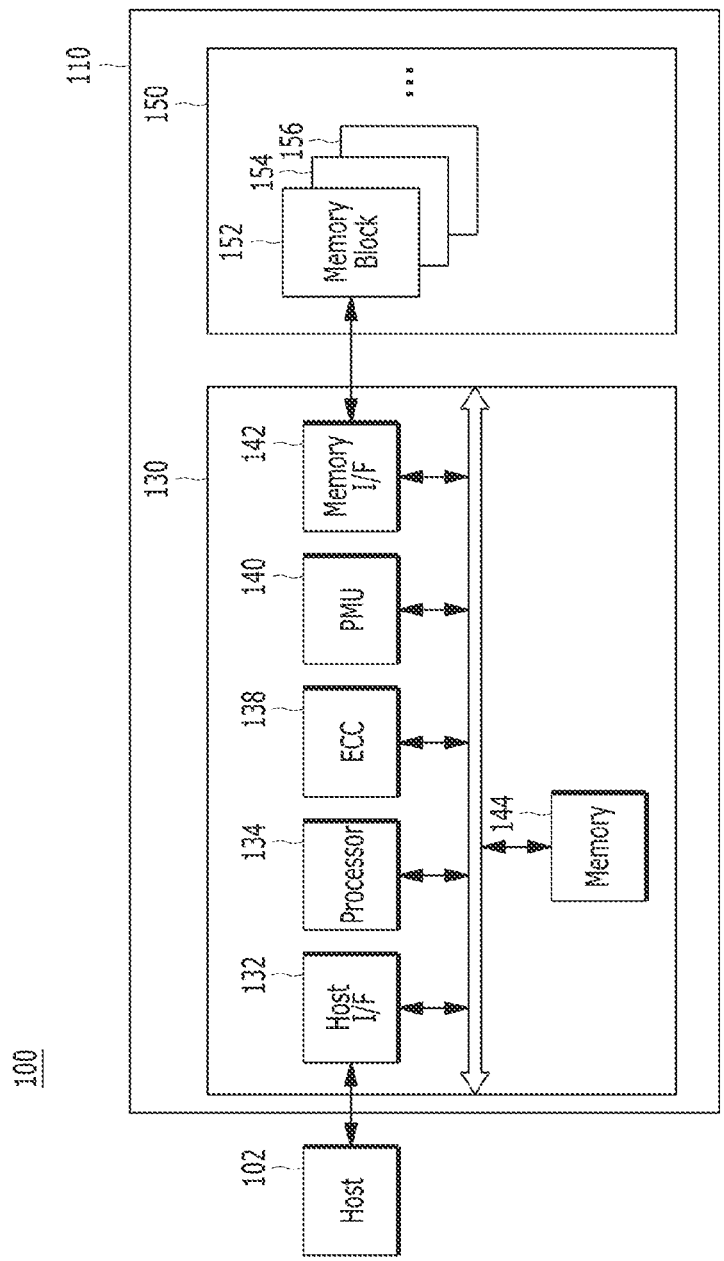
FIG. 3 is a diagram schematically illustrating a data processing system in accordance with an embodiment.

FIG. 3 illustrates an example of a data processing system 100. In some implementations, the data processing system 100 may include a host 102 engaged, interlocked or in communication with a memory system 110.

The host 102 may include a portable electronic device (e.g., mobile phone, MP3 player, laptop computer, etc.) or an electronic device such as a desktop computer, a game player, a television (TV), a projector and others.

The host 102 may also include at least one operating system (OS) to manage and control functions and operations of the host 102. For example, the OS can provide interoperability between the host 102 engaged with the memory system 110 and a user of the memory system 110. The OS may support functions and operations corresponding to user requests.

By the way of example but not limitation, the OS can be a general operating system or a mobile operating system, for example, according to mobility of the host 102. The general operating system may be, for example, a personal operating system or an enterprise operating system according to system requirements or a user environment. The personal operating system (e.g., Windows, Chrome, etc.) may be subject to support services for various purposes. The enterprise operating systems can be specialized for securing and supporting high performance, including Windows servers, Linux, Unix and others.

The mobile operating system may be based on, for example, Android, iOS, Windows mobile, or another system. The mobile operating system may be subject to support services or functions for mobility (e.g., a power saving function). In one embodiment, the host 102 may include a plurality of operating systems, and may execute multiple operating systems interlocked with the memory system 110 based on a user request. The host 102 may transmit a plurality of commands corresponding to the user requests to the memory system 110, to thereby perform operations corresponding to commands within the memory system 110.

The memory system 110 may operate or perform a specific function or operation in response to a request from the host 102, e.g., may store data to be accessed by the host 102. The memory system 110 may be used as a main memory system or an auxiliary memory system of the host 102. The memory system 110 may be implemented with one of various types of storage devices electrically coupled with the host 102 and may communicate therewith according to a protocol of a host interface. Non-limiting examples of the storage device include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and others.

The storage devices for the memory system 110 may be implemented with a volatile memory device (e.g., dynamic random access memory (DRAM) and static RAM (SRAM)) and/or a nonvolatile memory device (e.g., read only memory (ROM), mask ROM (MROM), programmable ROM (PROM), erasable programmable ROM (EPROM), electrically erasable programmable ROM (EEPROM), ferroelectric RAM (FRAM), phase-change RAM (PRAM), magneto-resistive RAM (MRAM), resistive RAM (RRAM or ReRAM), flash memory, etc.).

The memory system 110 may include a controller 130 and a memory device 150. The memory device 150 may store data to be accessed by the host 102. The controller 130 may control storage of data in the memory device 150.

The controller 130 and memory device 150 may be integrated into a single semiconductor device, which, for example, may be in any of the types of memory systems as exemplified above. By the way of example but not limitation, the controller 130 and the memory device 150 may be integrated into a single semiconductor device. The controller 130 and memory device 150 may be integrated into an SSD for improving operation speed. When the memory system 110 is used as an SSD, the operating speed of the host 102 connected to the memory system 110 can be improved more than that of the host 102 implemented with a hard disk.

In addition, the controller 130 and the memory device 150 may be integrated into one semiconductor device to form a memory card, such as a PC card (PCMCIA), a compact flash card (CF), a memory card such as a smart media card (SM, SMC), a memory stick, a multimedia card (MMC, RS-MMC, MMCmicro), a SD card (SD, miniSD, microSD, SDHC), a universal flash memory or others.

The memory system 110 may be configured as part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain the storage of data therein even when electrical power is not supplied. The memory device 150 may store data provided from the host 102 through a write operation and may provide data stored therein to the host 102 through a read operation. The memory device 150 may include a plurality of memory blocks 152, 154, 156, each of which may include a plurality of pages. Each of the pages may include a plurality of memory cells to which word lines (WL) are electrically coupled. The memory device 150 also includes a plurality of memory dies, each of which includes a plurality of planes and each of the planes including a plurality of memory blocks 152, 154, 156. The memory device 150 may be a non-volatile memory device. Examples include a flash memory having a three-dimensional stack structure.

The controller 130 may control overall operations of the memory device 150, such as read, write, program and erase operations. For example, the controller 130 may control the memory device 150 in response to a request from the host 102. The controller 130 may provide the data, read from the memory device 150, to the host 102. The controller 130 may store the data, provided by the host 102, to the memory device 150.

The controller 130 may include a host interface (I/F) 132, a processor 134, an ECC unit 138, a power management unit (PMU) 140, a memory interface (I/F) 142 and a memory 144, all operatively coupled via an internal bus.

The host interface 132 may process commands and data from the host 102 and may communicate with the host 102 through at least one of various interface protocols. Examples include universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI) and integrated drive electronics (IDE). In an embodiment, the host interface 132 may exchange data with host 102 based on instructions, e.g., firmware, such as a host interface layer (HIL).

The ECC unit 138 may correct one or more error bits of data processed in the memory device 150 and which may include an ECC encoder and an ECC decoder. The ECC encoder can perform error correction encoding of data to be programmed in the memory device 150, in order to generate encoded data into which one or more parity bits are added. The encoded data may be stored by the ECC encoder in memory device 150. The ECC decoder can detect and correct errors in data read from the memory device 150 when the controller 130 reads data stored in the memory device 150. For example, after performing error correction decoding on the data read from the memory device 150, the ECC component 138 can determine whether the error correction decoding has succeeded and output an instruction signal (e.g., a correction success signal or a correction fail signal).

The ECC component 138 can use the parity bit, generated during the ECC encoding process, to correct the error bit(s) of the read data. When the number of error bits is greater than or equal to a threshold number of correctable error bits, the ECC component 138 might not correct error bits but instead may output an error correction fail signal indicating failure in correcting the error bits.

The ECC component 138 may perform an error correction operation in various ways, including but not limited to coded modulation. Examples include a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), and a Block coded modulation (BCM), as well as others. The ECC component 138 may also include various circuits, modules, systems or devices for performing error correction operation based on at least one of the codes.

The PMU 140 may manage electrical power of the controller 130.

The memory interface 142 may serve as an interface for handling commands and data transferred between the controller 130 and the memory device 150, in order to allow the controller 130 to control the memory device 150 in response to a request from the host 102. The memory interface 142 may generate a control signal for the memory device 150 and may process data entered into or outputted from the memory device 150 based on the control of the processor 134 when the memory device 150 is a flash memory, including but not limited to a NAND flash memory. The memory interface 142 can serve an interface for handling commands and data between the controller 130 and the memory device 150. For example, the memory interface 142 may serve as a NAND flash interface for purposes of handling operations between the controller 130 and the memory device 150. In an embodiment, the memory interface 142 can be implemented through firmware (e.g., Flash Interface Layer (FIL)), which serves as a component to exchange data with memory device 150.

The memory 144 may support operations performed by the memory system 110 and the controller 130. The memory 144 may store temporary or transactional data relating to or delivered for operations in the memory system 110 and the controller 130. The controller 130 may control the memory device 150 in response to a request from the host 102. The controller 130 may deliver data read from the memory device 150 to the host 102. The controller 130 may store data entered through the host 102 within the memory device 150. The memory 144 may be used to store data for the controller 130 and the memory device 150 to perform operations such as read operations or program/write operations.

The memory 144 may be implemented with a volatile memory, e.g., a static random access memory (SRAM), a dynamic random access memory (DRAM), or both. The second memory 144 may be disposed within the controller 130. In one embodiment, the memory 144 may be external and coupled to the controller 130. For instance, the memory 144 may include an external volatile memory having a memory interface that transfers data and/or signals between the memory 144 and the controller 130.

The memory 144 can store data for performing operations such as data writing and data reading requested by the host 102, and/or data transfer between the memory device 150 and the controller 130 for background operations such as garbage collection and wear levelling. In an embodiment, to support operations in the memory system 110, the memory 144 may include one or more of a program memory, a data memory, a write buffer/cache, a read buffer/cache, a data buffer/cache, a map buffer/cache, or others.

The processor 134 may be implemented, for example, with a microprocessor or a central processing unit (CPU). In one embodiment, the memory system 110 may include one or more processors 134. The processor 134 may control overall operation of the memory system 110. By way of example but not limitation, the processor 134 can control a program operation or a read operation of the memory device 150, in response to a write request or a read request entered from the host 102. In an embodiment, the processor 134 may use or execute instructions (e.g., firmware) to control overall operation of the memory system 110. In one embodiment, firmware may refer to a flash translation layer (FTL). The FTL may operate as an interface between the host 102 and the memory device 150. The host 102 may transmit requests for write and read operations to the memory device 150 through the FTL.

For example, the controller 130 may use the processor 134 (e.g., implemented as a microprocessor or central processing unit (CPU)) to perform operations requested from the host 102 in the memory device 150. The processor 134 may engage with the memory device 150 to handle instructions or commands corresponding to commands from the host 102. For example, the controller 130 can perform a foreground operation as an operation corresponding to a command from the host 102. Examples of the command include a program operation corresponding to a write command, a read operation corresponding to a read command, an erase/discard operation corresponding to an erase/discard command, and a parameter set operation corresponding to a set parameter command or a set feature command with a set command.

In one embodiment, the controller 130 may perform a background operation on the memory device 150 through the processor 134. By way of example but not limitation, the background operation for the memory device 150 includes an operation of copying and storing data stored in a memory block (among memory blocks 152, 154, 156 in the memory device 150) to another memory block, e.g., a garbage collection (GC) operation. The background operation can include an operation of moving or swapping data stored in at least one of the memory blocks 152, 154, 156 to at least another one of the memory blocks 152, 154, 156, e.g., a wear leveling (WL) operation.

During a background operation, the controller 130 may use the processor 134 to store the map data (stored in the controller 130) to at least one of the memory blocks 152, 154, 156 in the memory device 150, e.g., a map flush operation. A bad block management operation of checking or searching for bad blocks among the memory blocks 152, 154, 156 is another example of a background operation that may be performed by the processor 134.

In memory system 110, controller 130 may perform a plurality of operations corresponding to commands entered from the host 102. For example, when performing program operations corresponding to program commands, read operations corresponding to read commands and erase operations corresponding to erase commands sequentially, randomly or alternatively, the controller 130 can determine or select channel(s) or way(s) to perform each operation. The channel(s) or way(s) may be ones that connect, for example, the controller 130 to a plurality of memory dies in the memory 150.

The controller 130 can send or transmit data or instructions, via the channels or ways, for performing each operation. The memory dies in the memory 150 can transmit operation results, via the same channels or ways, after respective operations are completed. Then, the controller 130 may transmit a response or an acknowledge signal to the host 102. In an embodiment, the controller 130 can check a status of each channel or each way. In response to a command from the host 102, the controller 130 may select at least one channel or way based on the status of each channel or way, so that instructions and/or operation results with data may be delivered via the selected channel(s) or way(s).

By the way of example but not limitation, the controller 130 can recognize statuses regarding channels (or ways) associated with memory dies in the memory device 150. For example, the controller 130 may determine the state of each channel or each way as a busy state, a ready state, an active state, an idle state, a normal state or an abnormal state, or various combinations thereof. The determination of which channel or way an instruction (and/or a data) is delivered through by the controller can be associated with a physical block address, e.g., to which die(s) the instruction (and/or the data) is delivered.

In the present embodiment, each of the plurality of zones ZONE 1 to ZONE N may include a plurality of memory blocks 152, 154, 156, . . . . In an embodiment, the number of memory blocks included in each of the plurality of zones ZONE 1 to ZONE N may be different from or the same as one another. A zone may be a storage area corresponding to a logical block address group (LBA GROUP) including a plurality of logical block addresses inputted from the host 102. Specifically, the plurality of zones may be areas for storing data corresponding to the respective logical block address groups (LBA GROUPs). As illustrated in FIG. 2, the first zone ZONE 1 may be an area for storing data corresponding to a first memory block group LBA GROUP 1. The second zone ZONE 2 may be an area for storing data corresponding to a second memory block group LBA GROUP 2. The third zone ZONE 3 may be an area for storing data corresponding to a third memory block group LBA GROUP 3. The $N^{th}$ zone ZONE N may be an area for storing data corresponding to an $N^{th}$ memory block group LBA GROUP N. Each of the logical block address groups may include consecutive logical block addresses.

In implementations, the memory controller 130 may be a multi-core memory controller that includes a plurality of different central processing units (CPUs) or CPU cores which are used to control operations performed on the plurality of zones 152, 154, 156 . . . within the memory device 150. Each of the plurality of cores is allocated to one zone group including a plurality of zones. For example, an operation performed on a specific zone corresponding to consecutive logical block addresses (LBA GROUP) inputted from the host 102 may be controlled by the allocated core to the zone group including the specific zone.

The amount of requests distributed to each of the cores may vary depending on zones corresponding to requests received from the host 102. Accordingly, the requests of the host 102 to the memory controller 130 may be excessively inputted to a specific core among the plurality of cores. In this case, load levels of the plurality of cores may be different from one another. In order to solve this problem, there is a need for a method of evenly distributing the host's requests to the plurality of cores to evenly maintain the load levels of the plurality of cores.

Figure 4:
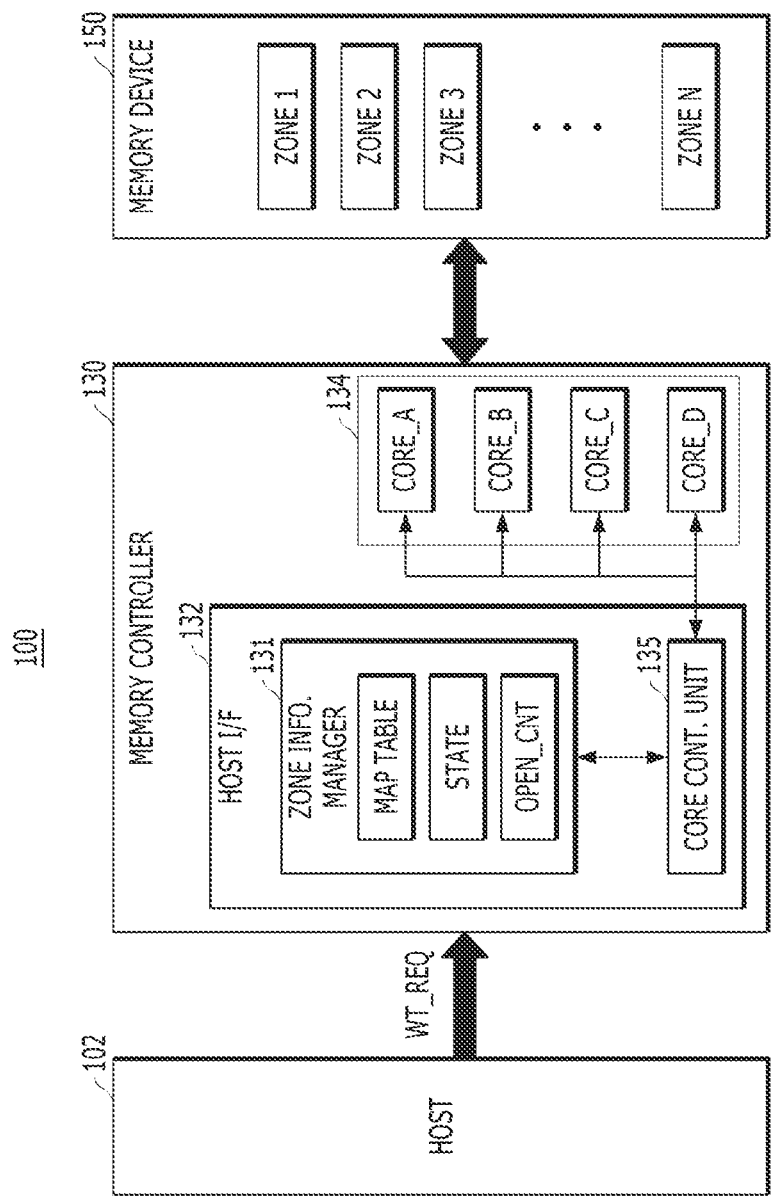
FIG. 4 is a diagram schematically illustrating an operation of a memory controller in accordance with an embodiment.

FIG. 4 is a diagram illustrating an example of a multi-core memory controller 130 used in a data processing system 100 in accordance with an embodiment.

In this example, the data processing system 100 may include a host 102, the multi-core memory controller 130 and a memory device 150 with different memory zones. The host 102, the memory controller 130 and the memory device 150 illustrated in FIG. 4 may correspond to the host 102, the memory controller 130 and the memory device 150 illustrated in FIG. 3.

The memory device 150 may include a plurality of memory blocks allocated to a plurality of zones ZONE 1, ZONE 2, ZONE 3, . . . , ZONE N, and be controlled by the memory controller 130.

The host 102 transmits a write request WT_REQ to the memory controller 130. The host 102 may transmit write data and zone identification information together with the write request WT_REQ to the memory controller 130. The zone identification information may include a logical block address LBA of the write data.

The memory controller 130 may include a host interface unit 132 and a plurality of CPU cores CORE_A, CORE_B, CORE_C and CORE_D. FIG. 4 illustrates that the memory controller 130 includes only four cores, but the disclosed technology is not limited thereto and may be implemented by a desired number of cores.

The plurality of cores CORE_A, CORE_B, CORE_C and CORE_D may correspond to the processor 134 illustrated in FIG. 3. The plurality of cores CORE_A, CORE_B, CORE_C and CORE_D may operate in parallel, and each of the cores CORE_A, CORE_B, CORE_C and CORE_D may drive a flash translation layer FTL.

In response to the write request WT_REQ from the host 102, the host interface unit 132 according to the present embodiment may check whether load levels of the plurality of cores CORE_A, CORE_B, CORE_C and CORE_D are maintained evenly, and manage the load levels evenly so that the amount of the loads are balanced in the plurality of cores CORE_A, CORE_B, CORE_C and CORE_D.

The host interface unit 132 may detect a first core that controls a zone on which a write operation requested by the write request WT_REQ from the host 102 is to be performed. The first core may have already been set to control the write operation performed on the zone to which data is written as requested by the host 102. In addition, the host interface unit 132 may determine a second core to perform the write operation instead of the first core based on the number of open zones controlled by the detected first core.

In the implementation of the disclosed technology, the second core may be a core that is selected by the memory controller 130 based on the detected load levels of the different cores for achieved a desired load balancing amongst the different cores and performs the write operation according to the write request WT_REQ.

Thus, in implementations of the disclosed technology, the first core may correspond to a core that controls the zone on which the write operation is requested to be performed according to the write request WT_REQ received from the host 102. The second core may correspond to a core that is selected by the memory controller 130 and performs the write operation according to the write request WT_REQ.

To achieve the desired load balancing in operating different cores in the memory controller 130, the host interface unit 132 of the disclosed technology may include a zone information management unit 131 and a core control unit 135.

The zone information manager 131 may generate a mapping table MAP TABLE including zone identification information and a mapping relationship between a zone corresponding to the zone identification information and a core controlling the zone.

The zone information manager 131 may generate state information STATE indicating a program state of each of the plurality of zones ZONE 1, ZONE 2, ZONE 3, . . . , ZONE N, in response to the write request WT_REQ received from the host 102. The state information STATE may include an open state OPEN, a closed state CLOSED, an empty state EMPTY and a full state FULL. The open state refers to a state that the memory controller 130 determines that a program operation can be performed on a corresponding zone. Thus, the open state may refer to the state in which a corresponding zone is capable of being used to perform a program operation requested by the write request WT_REQ received from the host 102. The open state may indicate a state in which a program operation is being performed or a state in which a program operation is scheduled to be performed. The closed state may indicate a state in which a program operation is determined to stop. The empty state, which is also known as an erased state, may indicate a state in which execution of a program operation is not determined. The full state may indicate a state in which a program operation has been completed.

The zone information manager 131 may generate an open count value OPEN_CNT of each of the plurality of cores CORE_A, CORE_B, CORE_C and CORE_D, on the basis of the generated state information STATE. The open count value OPEN_CNT may refer to the number of open zones controlled by a corresponding core. The open zone may refer to a zone in which the state information STATE is an open state. For example, it is assumed that the core CORE_B controls five zones ZONE 2, ZONE 6, ZONE 10, ZONE 14 and ZONE 18. At this time, when the state information STATE of the four zones ZONE 2, ZONE 6, ZONE 10 and ZONE 14 is "OPEN", and the state information STATE of the other one zone ZONE 18 is "EMPTY", the open count value OPEN_CNT of the core CORE_B may be "4".

FIG. 4 illustrates that storage units in which the mapping table MAP TABLE, the state information STATE and the open count value OPEN_CNT are stored individually are stored in the zone information manager 131, but the disclosed technology is not limited thereto.

The core control unit 135 may detect or identify the zone on which the write operation is requested to be performed according to the write request WT_REQ, on the basis of the zone identification information. The zone identification information may include a logical block address LBA. For example, when write data and a logical block address are received along with the write request WT_REQ from the host 102, the core control unit 135 may detect or identify a zone corresponding to the logical block address. The core control unit 135 may determine a core controlling the detected or identified zone as the first core. Thus, the first core corresponds to a core whose corresponding identification information is included in the write request WT_REQ received from the host.

The core control unit 135 may check whether a load level of the first core is high, on the basis of a first open count value of the first core that controls the zone on which the write operation is requested to be performed according to the write request WT_REQ. The first open count value may indicate the number of open zones controlled by the first core.

In an embodiment, when the first open count value is the maximum among a plurality of open count values OPEN_CNT, the core control unit 135 may determine that the load level of the first core is high. In this case, the core control unit 135 operates to perform the load balancing amongst the different cores.

In an embodiment, when the first open count value is equal to or greater than a threshold value, the core control unit 135 may determine that the load level of the first core is high. Thus, the core control unit 135 may determine that the load levels of the plurality of cores CORE_A, CORE_B, CORE_C and CORE_D are not even and performs load balancing operations. The threshold value may include an average value of the plurality of open count values. In addition, the threshold value may include a value greater than the average value of the plurality of open count values and smaller than a maximum open count value.

When the load level of the first core is high, the core control unit 135 may change a core to perform the write operation corresponding to the write request WT_REQ.

Thus, on the basis of the first open count value of the first core, the core control unit 135 may control the plurality of cores CORE_A, CORE_B, CORE_C and CORE_D so that a second core having a lower load level than the first core performs the write operation corresponding to the write request WT_REQ instead of the first core. The second core refers to a core that is determined by the core control unit 135 to perform the write operation instead of the first core that controls the zone on which the write operation is requested to be performed according to the write request WT_REQ.

In addition, the core control unit 135 may determine, as the second core, a core having an open count value smaller than the first open count value.

In an embodiment, when the first open count value is the maximum among the plurality of open count values OPEN_CNT, the core control unit 135 may determine, as the second core, a core having a minimum open count value. In some other implementations, when the first open count value is not the maximum, the core control unit 135 may determine the first core as the second core.

In an embodiment, when the first open count value is equal to or greater than the threshold value, the core control unit 135 may determine, as the second core, a core having an open count value smaller than the threshold value. In some other implementations, when the first open count value is smaller than the threshold value, the core control unit 135 may determine the first core as the second core.

During the write operation, the second core may change at least one empty zone, controlled by the second core, to an open zone based on the control of the memory controller 130, and perform the write operation on memory blocks allocated to the zone newly changed to an open zone.

As such, the memory controller 130 according to the present embodiment can proceed the write operation requested by the write request WT_REQ received from the host by changing the core to perform the write operation based on the open count values OPEN_CNT, thereby evenly managing the load levels of the plurality of cores CORE_A, CORE_B, CORE_C and CORE_D.

FIGS. 5A to 5D are diagrams illustrating an operation of changing a core performing a write operation in accordance with an embodiment.

Figure 5A:
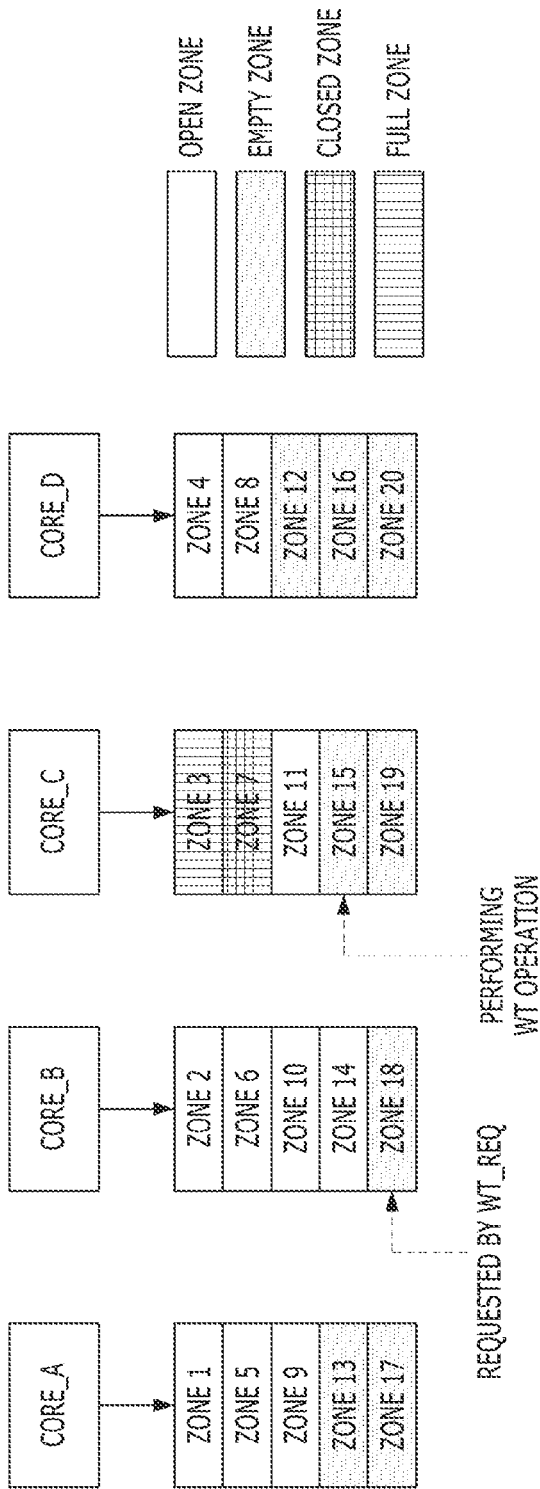

Specifically, FIG. 5A is a diagram illustrating a plurality of cores controlling a plurality of zones in accordance with an embodiment. FIG. 5B is a diagram illustrating a mapping table in accordance with an embodiment. FIG. 5C is a diagram illustrating state information in accordance with an embodiment. FIG. 5D is a diagram illustrating an open count value in accordance with an embodiment. A method illustrated in FIGS. 5A to 5D may be performed by the memory controller 130 illustrated in FIG. 4.

Each of a plurality of cores CORE_A, CORE_B, CORE_C and CORE_D illustrated in FIG. 5A may control a write operation performed on five zones. The core CORE_A may control zones ZONE 1, ZONE 5, ZONE 9, ZONE 13 and ZONE 17, the core CORE_B may control zones ZONE 2, ZONE 6, ZONE 10, ZONE 14 and ZONE 18, the core CORE_C may control zones ZONE 3, ZONE 7, ZONE 11, ZONE 15 and ZONE 19, and the core CORE_D may control zones ZONE 4, ZONE 8, ZONE 12, ZONE 16 and ZONE 20. In the present embodiment, the number of cores and the number of zones controlled by each of the cores may vary depending on an embodiment.

The mapping table illustrated in FIG. 5B may include a mapping relationship between a zone ZONE corresponding to zone identification information ZONE_ID and a core CORE controlling the zone ZONE.

The state information STATE illustrated in FIG. 5C may indicate a program state of each of the plurality of zones ZONE 1 to ZONE 20. The state information STATE may include an open state OPEN, a closed state CLOSED, an empty state EMPTY and a full state FULL. The zones ZONE 1, ZONE 2, ZONE 4, ZONE 5, ZONE 6, ZONE 8, ZONE 9, ZONE 10, ZONE 11 and ZONE 14 may be in the open state OPEN in which a program operation is determined to be performed. The open state OPEN may include a state in which the program operation is being performed or the program operation is scheduled to be performed soon. The zone ZONE 7 may be in the closed state CLOSED in which the program operation is determined to stop. The zones ZONE 12, ZONE 13, ZONE 15, ZONE 16, ZONE 17, ZONE 18, ZONE 19 and ZONE 20 may be in the empty state EMPTY in which execution of the program operation is not determined, and memory blocks allocated to the empty zones in the empty state EMPTY may be in erased state of data. The zone ZONE 3 may be in the full state FULL in which the program operation has been completed.

An open count value OPEN_CNT illustrated in FIG. 5D may indicate the number of open zones controlled by each of the plurality of cores CORE_A, CORE_B, CORE_C and CORE_D. Referring to the open count value OPEN_CNT, the open count value OPEN_CNT of the core CORE_A is 3, the open count value OPEN_CNT of the core CORE_B is 4, the open count value OPEN_CNT of the core CORE_C is 1, and the open count value OPEN_CNT of the core CORE_D is 2. Thus, the numbers of open zones controlled by the plurality of cores CORE_A, CORE_B, CORE_C and CORE_D are 3, 4, 1 and 2, respectively.

Among the plurality of cores CORE_A, CORE_B, CORE_C and CORE_D, a core having the largest open count value OPEN_CNT is the core CORE_B. Thus, since the core CORE_B controls the largest number of open zones, the load level of the core CORE_B according to the program operation is the highest. At this time, when the core CORE_B performs a write operation according to a write request, the load level of the core CORE_B becomes even higher. Accordingly, the memory controller 130 may determine that the load levels of the plurality of cores CORE_A, CORE_B, CORE_C and CORE_D are not even, and thus control the plurality of cores CORE_A, CORE_B, CORE_C and CORE_D so that a different core other than CORE_B performs the write operation corresponding to the write request.

Hereinafter, an operation of changing a core performing a write operation according to the present embodiment is described in detail with reference to FIGS. 5A to 5D.

For example, when a write request WT_REQ is received ("REQUESTED BY WT_REQ" in FIG. 5B) from the host 102 together with zone identification information "LBA 18." Referring to the mapping table as shown in FIG. 5B, "LBA 18" is the zone identification information ZONE_ID corresponding to ZONE 18 controlled by CORE_B. Based on the mapping table illustrated in FIG. 5B, the memory controller 130 may detect or identify a zone, ZONE 18, corresponding to the received zone identification information, LBA 18.

Based on the mapping table illustrated in FIG. 5B, the memory controller 130 may confirm or identify a core corresponding to the detected zone ZONE 18. Thus, the memory controller 130 confirms that "CORE_B" controls the zone, Zone 18. The zone, ZONE 18, is a zone on which the host 102 requests the write operation to be performed ("REQUESTED BY WT_REQ" in FIG. 5A). The memory controller 130 may determine, as a first core, the core CORE_B controlling the zone ZONE 18.

In the present embodiment, it is described that one zone is a storage area corresponding to one logical block address LBA, but the disclosed technology is not limited thereto. Thus, as described with reference to FIG. 2, one zone may be a storage area corresponding to a logical block address group LBA GROUP including a plurality of logical block addresses inputted from the host 102.

The memory controller 130 generates state information STATE of a plurality of zones illustrated in FIG. 5C. In addition, the memory controller 130 may generate a plurality of open count values OPEN_CNT illustrated in FIG. 5D by summing, for each core, the number of zones each having the open state OPEN, among the generated state information STATE. Thus, as illustrated in FIG. 5D, the memory controller 130 may generate the open count values OPEN_CNT for each core that indicates the number of open zones controlled by each of the plurality of cores CORE_A, CORE_B, CORE_C and CORE_D.

The memory controller 130 may determine, as a first open count value, "4", which is the open count value OPEN_CNT of the first core CORE_B, and determine a second core to perform the write operation corresponding to the write request WT_REQ, on the basis of the first open count value.

In some implementations, the memory controller 130 of the disclosed technology may determine, as the second core, the core CORE_C or CORE_D, which is a core having an open count value OPEN_CNT smaller than the first open count value "4".

When the first open count value "4" is the maximum among the plurality of open count values OPEN_CNT, the memory controller 130 according to the present embodiment may determine, as the second core, a core having the minimum open count value. Since the first open count value "4" of the first core CORE_B is the maximum among the plurality of open count values 3, 4, 1 and 2, the memory controller 130 may determine, as the second core, the core CORE_C having the minimum open count value "1".

When the first open count value "4" of the first core CORE_B is equal to or greater than a threshold value, for example, "2.5", the memory controller 130 according to another embodiment may determine, as the second core, the core CORE_C having an open count value OPEN_CNT, for example, "1", smaller than the threshold value.

Since the first open count value "4" is equal to or greater than the threshold value "2.5", the memory controller 130 may determine, as the second core, the core CORE_C having the open count value "1" smaller than the threshold value. In this case, the memory controller 130 may also determine, as the second core, the core CORE_D having an open count value "2" smaller than the threshold value.

Subsequently, the memory controller 130 may control the second core CORE_C so that the second core CORE_C performs the write operation. During the write operation, the memory controller 130 may update state information STATE of the zone ZONE 15, which is one of empty zones controlled by the second core CORE_C, in order to change the zone ZONE 15 to an open zone ("CHANGING TO 'OPEN'" in FIG. 5C). In addition, the memory controller 130 may perform the write operation on memory blocks allocated to the zone newly changed to the open zone ZONE 15 ("PERFORMING WT OPERATION" in FIG. 5A).

Furthermore, the memory controller 130 may update the zone ZONE 18, which corresponds to LBA 18 and on which the host requests the write operation to be performed, to the zone ZONE 15 ("CHANGING TO 'ZONE 15'" in FIG. 5B) in the mapping table illustrated in FIG. 5B. In addition, the memory controller 130 may update a core controlling the zone corresponding to LBA 18 from the core CORE_B to the core CORE_C ("CHANGING TO 'CORE_C'" in FIG. 5B).

Figure 6:
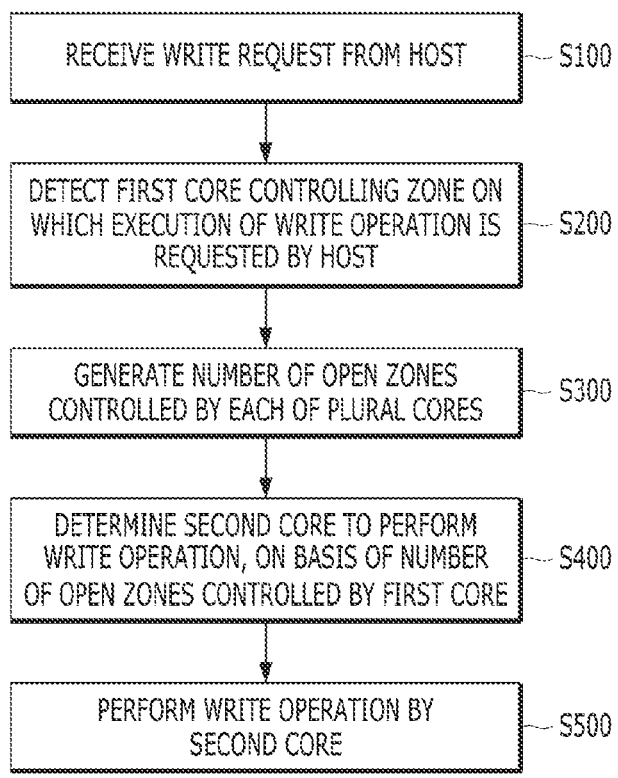
FIG. 6 is a flowchart illustrating an operation of a memory controller in accordance with an embodiment.

FIG. 6 is a flowchart illustrating an example of an operating method of a memory controller in accordance with an embodiment. The method illustrated in FIG. 6 may be performed, for example, by the memory controller 130 illustrated in FIG. 4.

The operating method of the memory controller 130 that controls a memory device including a plurality of memory blocks allocated to a plurality of zones and includes a plurality of cores controlling the plurality of zones may include operations S100, S200, S300, S400 and S500.

At operation S100, the memory controller 130 may receive a write request WT_REQ from the host 102.

At operation S200, the memory controller 130 may detect a first core that controls a zone corresponding to the write request WT_REQ. The memory controller 130 may detect or identify the zone corresponding to the write request WT_REQ, on the basis of zone identification information received from the host 102 and associated with the write request WT_REQ. The zone identification information may include a logical block address LBA. In addition, the memory controller 130 may determine, as the first core, a core that controls the detected zone.

At operation S300, the memory controller 130 may generate open count values OPEN_CNT in response to the received write request WT_REQ, the open count values each indicating the number of open zones controlled by each of the plurality of cores. The open zone may refer to a zone on which a program operation is determined to be performed. The operation 300 of generating the open count values OPEN_CNT may include an operation of generating state information STATE indicating open states of the plurality of zones and an operation of generating the plurality of open count values OPEN_CNT on the basis of the state information STATE.

At operation S400, the memory controller 130 may determine a second core to perform a write operation corresponding to the write request WT_REQ, on the basis of a first open count value OPEN_CNT of the first core. The memory controller 130 may determine, as the second core, a core having an open count value OPEN_CNT smaller than the first open count value OPEN_CNT. The operation S400 in which the memory controller 130 determines the second core is described in detail with reference to FIGS. 7A and 7B.

At operation S500, the memory controller 130 may control the second core so that the second core having a lower load level than the first cores the write operation. In some implementations, the second core is different from the first core having a high load level and controls the zone requested by the host to perform the write operation. When the second core performs the write operation, the memory controller 130 may change an empty zone controlled by the second core to an open zone, and control the second core to perform the write operation on memory blocks allocated to the zone newly changed to the open zone.

Figure 7A:
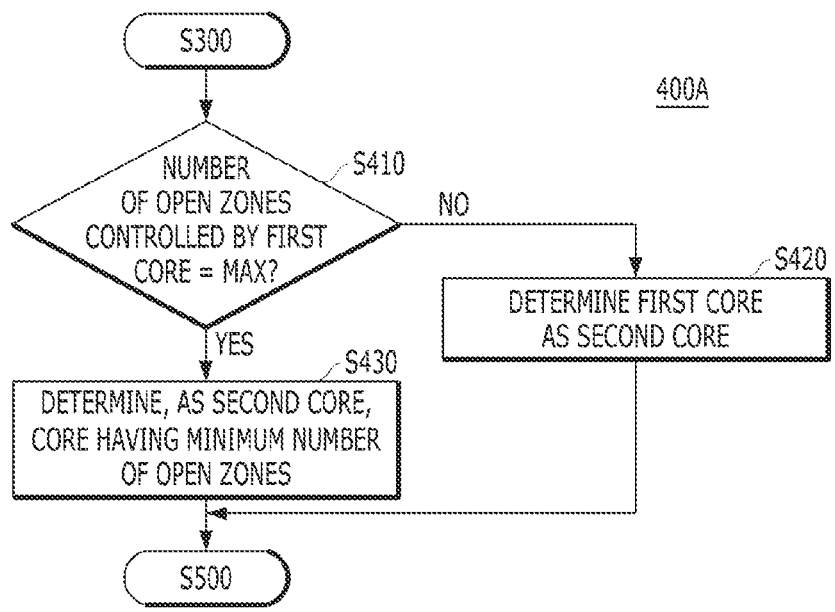
FIGS. 7A and 7B are flowcharts illustrating an example of an operation in which the memory controller illustrated in FIG. 6 changes a core performing a write operation.
Figure 7B:
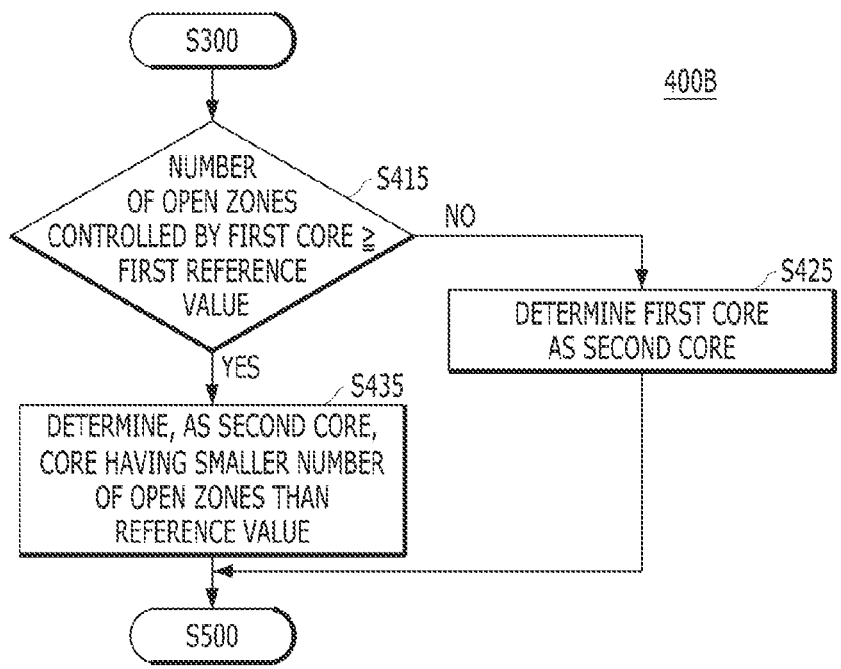

FIGS. 7A and 7B are flowcharts illustrating an operation in which a memory controller determines a second core in accordance with embodiments. FIGS. 7A and 7B illustrate different examples 400A and 400B of the operation S400 of FIG. 6. The operations described with reference to FIGS. 7A and 7B may be performed by the memory controller 130 illustrated in FIG. 4.

Referring to FIG. 7A, after the operation S300 of FIG. 6, at the operation S400, the memory controller 130 may determine whether the first open count value OPEN_CNT has a maximum value. The first core may be a core that controls a zone on which the host 102 requests a write operation to be performed. The first open count value OPEN_CNT may be the number of open zones controlled by the first core.

When a determination result of the operation S410 indicates that the first open count value OPEN_CNT is not the maximum among the plurality of open count values OPEN_CNT (that is, "NO" in the operation S410), at the operation S420, the memory controller 130 may determine the first core as the second core without changing the core.

When the determination result of the operation S410 indicates that the first open count value OPEN_CNT is the maximum among the plurality of open count values OPEN_CNT (that is, "YES" in step S410), at the operation S430, the memory controller 130 may determine, as the second core, a core having the minimum open count value OPEN_CNT. Subsequently, the memory controller 130 may perform the operation S500 of FIG. 6.

Referring to FIG. 7B, after performing the operation S300 of FIG. 6, at the operation S415, the memory controller 130 may determine whether the first open count value OPEN_CNT is equal to or greater than the threshold value. The threshold value may include an average value of the number of open zones controlled by each of the plurality of cores. The first core may be a core that controls a zone on which the host 102 requests a write operation to be performed. The first open count value OPEN_CNT may be the number of open zones controlled by the first core.

When a determination result of the operation S415 indicates that the first open count value OPEN_CNT is not equal to or greater than the threshold value (that is, "NO" in the operation S415), at the operation S425, the memory controller 130 may determine the first core as the second core without changing the core to perform the write operation.

When the determination result of the operation S415 indicates that the first open count value OPEN_CNT is equal to or greater than the threshold value (that is, "YES" in the operation S415), at the operation S435, the memory controller 130 may determine, the second core, a core having the open count value OPEN_CNT smaller than the threshold value. Subsequently, the memory controller 130 may perform the operation S500 of FIG. 6.

A memory controller and an operating method thereof according to the embodiments of the disclosed technology may prevent a load according to a write operation from being concentrated on a specific core, and equalize load levels of a plurality of cores that control a plurality of zones.

Although examples of a memory system and an operating method thereof have been described with reference to the specific embodiments, variations and enhancements of the disclosed embodiments and other embodiments may be made based on what is disclosed or illustrated in this patent document.

What is claimed is:

1. A memory controller that controls a memory device including a plurality of memory blocks that are allocated to a plurality of zones for storing data, the memory controller comprising:
a plurality of processing cores controlling data operations in the plurality of zones in the memory device; and
an external interface unit in communication with an external device and configured to receive, from the external device, a write request requesting to perform a write operation on a first zone in the memory device, the external interface unit configured to identify a first processing core for controlling the first zone and determine a second core to perform the write operation based on a number of open zones controlled by the first core and having an open state indicating a capability to execute a program operation.

2. The memory controller of claim 1, wherein the external interface unit is further configured to determine the second core having a smaller number of open zones than the open zones controlled by the first core.

3. The memory controller of claim 1, wherein the external interface unit is further configured to determine the second core having a smaller number of open zones than a threshold value when the number of open zones controlled by the first core is equal to or greater than the threshold value.

4. The memory controller of claim 1, wherein the second core is configured to change a state of a third zone controlled by the second core and having an empty state for which the capability to execute the program operation is not determined to an open state, and perform the write operation on a memory block allocated to the third zone.

5. A memory controller that controls a memory device including a plurality of memory blocks allocated to a plurality of zones, the memory controller comprising:
a plurality of cores controlling the plurality of zones to perform data operations in the plurality of zones;
a zone information manager in communication with an external device and configured to (1) receive, from the external device, a write request requesting to perform a write operation on a first zone and (2) generate, in response to receiving the write request, open count values corresponding to the plurality of cores that indicate a number of zones controlled by a corresponding core and having an open state indicating a capability to execute a program operation; and
a core control unit in communication with the zone information manager and configured to determine a second core to perform the write operation based on a first open count value for a first core controlling the first zone.

6. The memory controller of claim 5, wherein the core control unit is configured to determine the second core having an open count value smaller than the first open count value.

7. The memory controller of claim 5, wherein the core control unit is configured to determine the first core as the second core when the first open count value is not the maximum among the open count values corresponding to the plurality of cores.

8. The memory controller of claim 5, wherein the core control unit is further configured to determine the second core having a smaller open count value than a threshold value when the first open count value is equal to or greater than the threshold value.

9. The memory controller of claim 8, wherein the threshold value includes an average value of the open count values corresponding to the plurality of cores.

10. The memory controller of claim 8, wherein the threshold value is greater than an average value of the open count values corresponding to the plurality of cores and is smaller than a maximum open count value that is greatest among the open count values corresponding to the plurality of cores.

11. The memory controller of claim 5, wherein the second core is configured to change a state of a third zone controlled by the second core and having an empty state for which the capability to execute the program operation is not determined to the open state, and perform the write operation on a memory block allocated to the third zone.

12. The memory controller of claim 5, further comprising a mapping table storage unit suitable for storing a mapping table including a mapping relationship between a zone corresponding to zone identification information and a cores that controls the zone.

13. An operating method of a memory controller that controls a memory device including a plurality of memory blocks allocated to a plurality of zones, the operating method comprising:
   generating a plurality of open count values in response to receiving, from an external device, a write request requesting to perform a write operation on a first zone, the open count value for each core indicating a number of zones controlled by a corresponding core and having an open state indicating a capability to execute a program operation; and
   determining a second core to perform a write operation corresponding to the write request based on a first open count value corresponding to a first core that controls the first zone.

14. The operating method of claim 13, wherein the determining of the second core includes determining the second core having an open count value smaller than the first open count value.

15. The operating method of claim 13, wherein the determining of the second core includes determining the second core having a minimum open count value when the first open count value is the maximum among the plurality of open count values.

16. The operating method of claim 15, wherein the determining of the second core includes determining the first core as the second core when the first open count value is not the maximum among the plurality of open count values.

17. The operating method of claim 13, wherein the determining of the second core includes determining the second core that controls a smaller open count value than a threshold value when the first open count value is equal to or greater than the threshold value.

18. The operating method of claim 17, wherein the threshold value includes an average value of the plurality of open count values.

19. The operating method of claim 17, wherein the threshold value is greater than an average value of the plurality of open count values and is smaller than a maximum open count value that is greatest among the plurality of open count values.

20. The operating method of claim 13, further comprising:
   changing a state of a third zone controlled by the second core and having an empty state for which the capability to execute the program operation is not determined, to an open state; and
   performing the write operation on a memory block allocated to the third zone.

* * * * *